United States Patent
Isomura

(10) Patent No.: US 6,946,886 B2
(45) Date of Patent: Sep. 20, 2005

(54) CLOCK-SYNCHRONIZED SERIAL COMMUNICATION DEVICE AND SEMICONDUCTOR INTEGRATED CIRCUIT DEVICE

(75) Inventor: Hirofumi Isomura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/760,349

(22) Filed: Jan. 21, 2004

(65) Prior Publication Data

US 2004/0165688 A1 Aug. 26, 2004

(51) Int. Cl.$^7$ ............................................. H03L 7/00
(52) U.S. Cl. ...................... 327/141; 327/145; 327/198; 375/355
(58) Field of Search .................................... 327/141, 142, 327/144, 145, 151, 198; 375/355, 363

(56) References Cited

U.S. PATENT DOCUMENTS 5,787,132 A * 7/1998 Kishigami et al. .......... 375/354
5,928,293 A * 7/1999 Jobling et al. ................. 701/2
6,134,285 A * 10/2000 Lo .............................. 375/355

FOREIGN PATENT DOCUMENTS

JP         A-09-237131         9/1997

* cited by examiner

*Primary Examiner*—Timothy P. Callahan
*Assistant Examiner*—An T. Luu
(74) *Attorney, Agent, or Firm*—Posz Law Group, PLC

(57) ABSTRACT

In a clock-synchronized serial communication device, a counter counts pulses in a communication clock signal. When the count reaches 8, the counter sets a start signal. With this start signal, a pulse generator outputs the first to fourth signals successively. Received data stored in a receiving shift register is transferred to a received-data processing circuit synchronously with the first signal. The received data is further transferred to a timer-setting value register as a timer-setting value synchronously with the second signal. A timer present value is output from a timer present value register synchronously with the third signal. The timer present value is further written into a transmitting shift register as transmission data synchronously with the fourth signal.

6 Claims, 6 Drawing Sheets

CLOCK-SYNCHRONIZED SERIAL COMMUNICATION DEVICE AND SEMICONDUCTOR INTEGRATED CIRCUIT DEVICE

CROSS REFERENCE TO RELATED APPLICATION

This application is based on and incorporates herein by reference Japanese Patent Application No. 2002-352363 filed on Dec. 4, 2002.

FIELD OF THE INVENTION

The present invention relates to a semiconductor integrated circuit device including a built-in clock-synchronized serial communication device suitable for the semiconductor integrated circuit device, which is required to operate at low power consumption.

BACKGROUND OF THE INVENTION

JP-A-H9-237131 discloses a technology for reducing power consumptions of peripheral circuits built-in in a semiconductor integrated circuit device (IC). The IC includes an access detection circuit for detecting accesses made by a CPU to each of the peripheral circuits and outputting a clock enable signal in the event of a detected access to any specific one of the peripheral circuits. This IC further includes a clock control circuit for supplying a main clock signal to an internal circuit of the specific peripheral circuit for a period of time long enough for completing an operation carried out by the internal circuit since an operation carried out by the access detection circuit to output the clock enable signal.

A clock-synchronized serial communication unit is one of the peripheral circuits. In general, a host microcomputer external to the IC transmits a communication clock signal and serial data to the serial communication unit. A receiving shift register employed inside the serial communication unit receives the serial data synchronously with the communication clock signal. After being temporarily stored in the receiving shift register, the serial data is processed inside the IC synchronously with a system clock signal generated internally in the IC. An operation to transmit data is carried out in the same way as this operation to receive data.

In the mean time, attempts are being made to reduce power consumptions of recent ICs. A recent IC is typically provided with a function to make a transition to a low power consumption mode (or a sleep operating mode) in which, after the lapse of a predetermined period of time or after completion of a predetermined process, for example, all internal clock signals of the IC are stopped till next serial data is received. Once the operation of an oscillation circuit for generating a system clock signal is stopped, however, it will take several milliseconds to several hundreds of milliseconds as a period of time to wait for the oscillation to become stable at the time the oscillation circuit resumes the oscillation. Examples of the oscillation circuit are a ceramic oscillation circuit, a CR oscillation circuit and a crystal oscillation circuit. The waiting period of time causes an inability to resume the communication immediately.

In order to solve this problem, instead of stopping all clock signals, a typical technique is proposed to allow only the oscillating operation of the CR oscillation circuit to continue and to process received data by using a clock signal generated by the CR oscillation circuit. If the IC is employed in for example an electronic control apparatus mounted on a vehicle, however, the continuation of the operation of even the CR oscillation circuit only is not a desirable technique for reducing the power consumption of the IC. This is because the driver often leaves the vehicle unused for a long time.

In addition, as another means, there is also conceived a configuration in which, after an external host microcomputer transmits serial data of 1 frame along with a communication clock signal to the IC, the microcomputer subsequently transmits an operation-use dummy communication clock signal to the IC to be utilized by the IC as a signal for processing the received serial data. The dummy communication clock signal is thus not used for synchronization of the communication for originally transmitting the serial data, but serves as a substitute for the system clock signal, which must otherwise be generated internally by the IC, to give timings for processing the received serial data.

By adoption of this other means, however, serial data cannot be transmitted continuously. Thus, the communication speed decreases and, in addition, the size of a program executed by the host microcomputer increases and control implemented by the microcomputer also becomes complicated because the microcomputer must transmit the extra dummy clock signal to be used by the IC to carry out the operation of processing the received serial data.

SUMMARY OF THE INVENTION

It is thus an object of the present invention to provide a clock-synchronized serial communication device capable of internally processing received data using neither a clock signal generated internally by an oscillation circuit such as a crystal oscillation circuit nor a dummy communication clock signal received from an external source.

It is another object of the present invention to provide a semiconductor integrated circuit device capable of operating at low power consumption by employing the clock-synchronized serial communication device therein.

In accordance with a clock-synchronized serial communication device of the present invention, serial data received from an external source is stored sequentially in a receiving shift register synchronously with a communication clock signal. Then, it is detected that a predetermination number of bits included in the serial data has been received and stored in the receiving shift register, and a reception completion signal is output. The predetermined number is typically equal to the number of bits composing the receiving shift register. When the reception completion signal is output, a timing pulse signal comprising only a predetermined number of timing pulses required for processing the received data stored in the receiving shift register is generated. These timing pulses are used to carry out various kinds of processing such as an operation to transfer the received data from the receiving shift register to another register.

In accordance with the present invention, it is possible to process received data without using a general-purpose clock signal generated by an oscillation circuit such as a ceramic oscillation circuit, a CR oscillation circuit or a crystal oscillation circuit. It is thus possible to continuously receive communication data transmitted sequentially without regard to an operation to stop the oscillation of the oscillation circuit and an operation to resume the oscillation. The general-purpose clock signal is generally used as a system clock signal.

In addition, a dummy communication clock signal is not required for internally processing the received data. Thus, a device serving as a partner of communication with the clock-synchronized serial communication device provided by the present invention is not required to execute special communication control for transmitting the dummy communication clock signal. The device serving as a partner of communication with the clock-synchronized serial communication device is referred to as an external device. As a result, the clock-synchronized serial communication device does not raise problems that the communication speed decreases, the size of a program executed by the external device increases and control implemented by the external device becomes complicated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
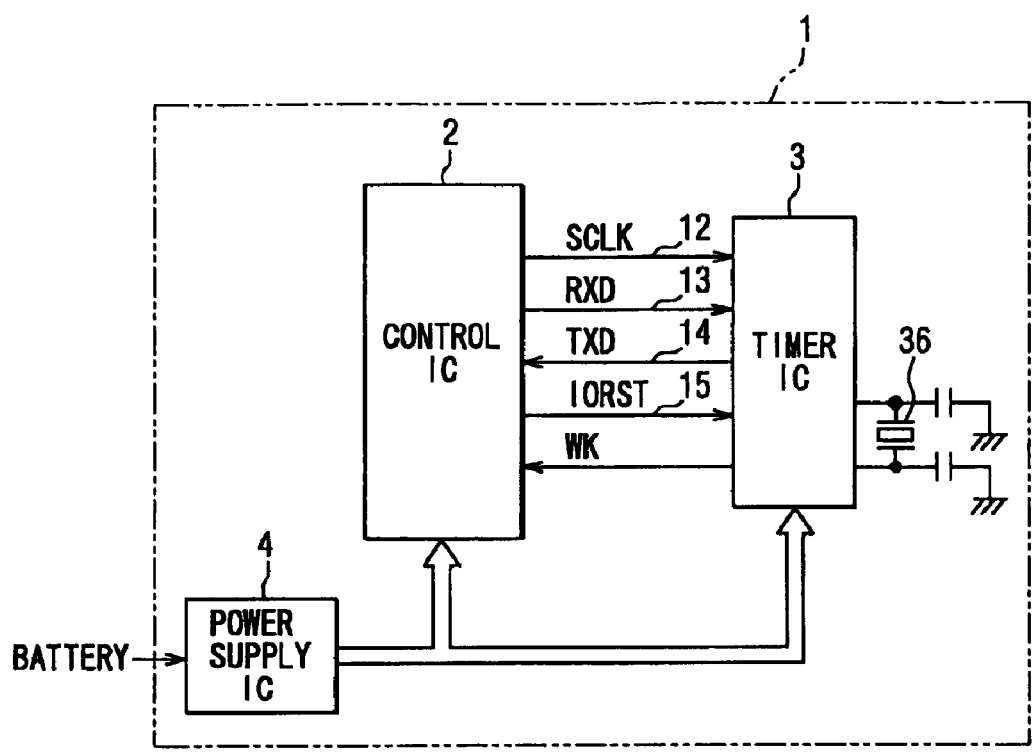
FIG. 1 is a block diagram showing an ECU, which is used for controlling the engine of a vehicle.

Referring first to FIG. 1, an electronic control unit (ECU) 1 is constructed for executing control of the engine of a vehicle. On a control board accommodated in the ECU 1, there are mounted components including a control IC 2, a timer IC 3 and a power supply IC 4. The control IC 2 is an IC for executing the control of the engine of the vehicle. The timer IC 3 is an IC serving as a soak timer. The power supply IC 4 serves as a series regulator. A power supply voltage generated by the power supply IC 4 is supplied to the control IC 2 and the timer IC 3.

Used for executing control of the engine of a vehicle as described above, the control IC 2 is a large-scale IC comprising digital circuits, which include a CPU as a main component, and a variety of analog circuits. The control IC 2 has a clock-synchronized serial communication function for communicating with the timer IC 3. The control IC 2 has a normal operating mode and a low power consumption mode (or a sleep operating mode). In the normal operating mode, the CPU operates synchronously with a system clock signal. In the sleep operating mode, on the other hand, the CPU is stopped by halting the system clock signal.

Figure 2:
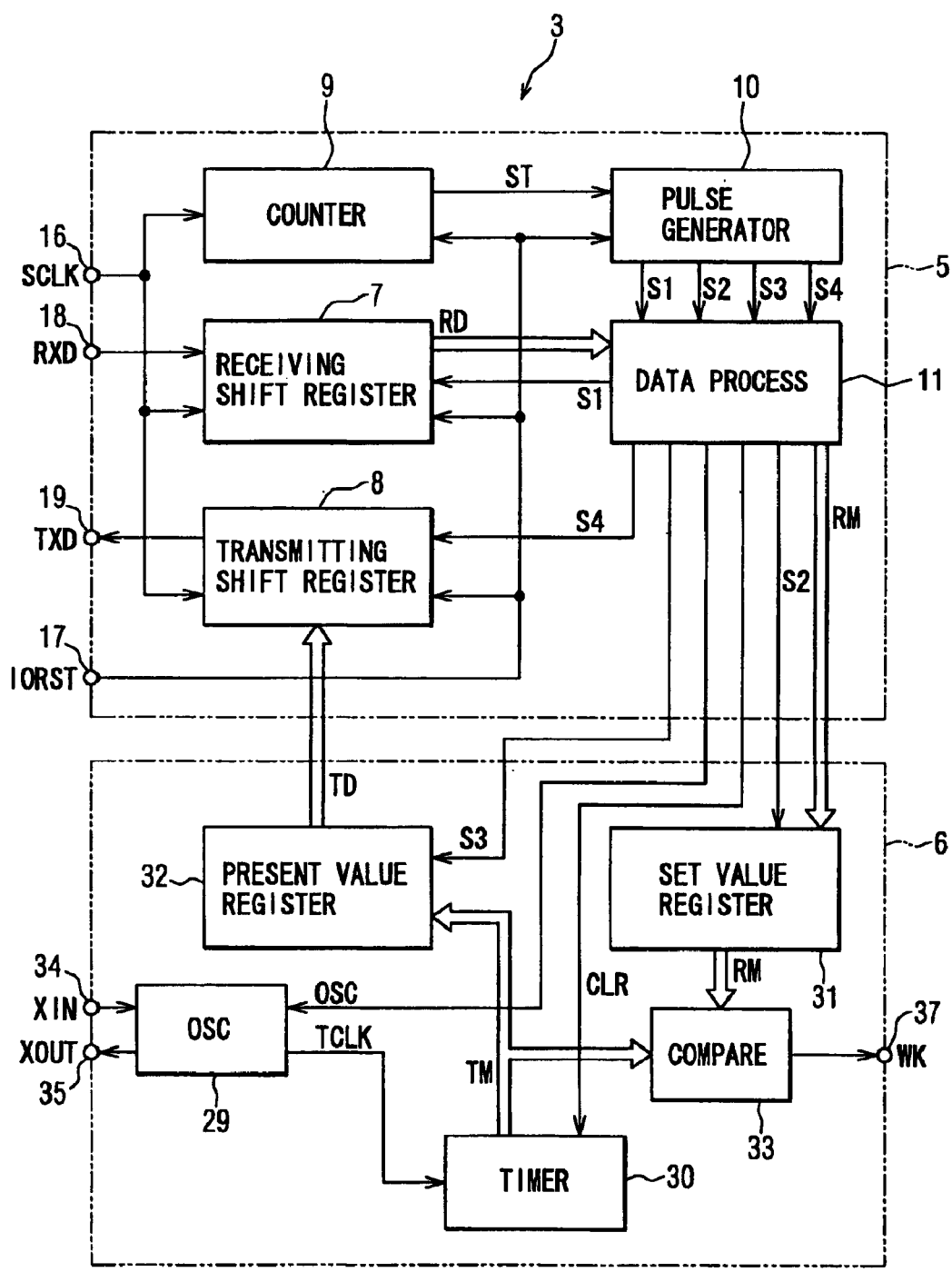
FIG. 2 is a block diagram showing a timer IC used in the ECU shown in FIG. 1.

The timer IC 3 is constructed as shown in FIG. 2. This timer IC 3 measures lapsing time by using a built-in timer 30. As the measured lapse of time becomes equal to a period of time (or an activation period) set by the control IC 2, the timer IC 3 outputs a wakeup signal WK to the control IC 2, which is in the sleep operating mode. The timer IC 3 is a small-scale IC including a communication circuit 5 and a control circuit 6. The communication circuit 5 functions as a clock-synchronized serial communication device, while the control circuit 6 serves as a generator of a system clock TCLK as well as a timer.

The communication circuit 5 comprises an 8-bit receiving shift register 7, an 8-bit transmitting shift register 8, a 3-bit counter 9, a pulse generator 10 and a received-data processing circuit 11. As shown in FIG. 1, clock-synchronized serial communications are carried out through 4 lines, namely, a communication clock line 12, a reception serial data line 13, a transmission serial data line 14 and a reset signal line 15. As shown in FIG. 2, a communication clock signal SCLK received by a terminal 16 is supplied to the receiving shift register 7, the transmitting shift register 8 and the counter 9. On the other hand, a reset signal IORST received by a terminal 17 is supplied to the receiving shift register 7, the transmitting shift register 8, the counter 9 and the pulse generator 10. The receiving shift register 7, the transmitting shift register 8, the counter 9 and the pulse generator 10 are reset when the reset signal IORST is set to an H level.

Figure 4:
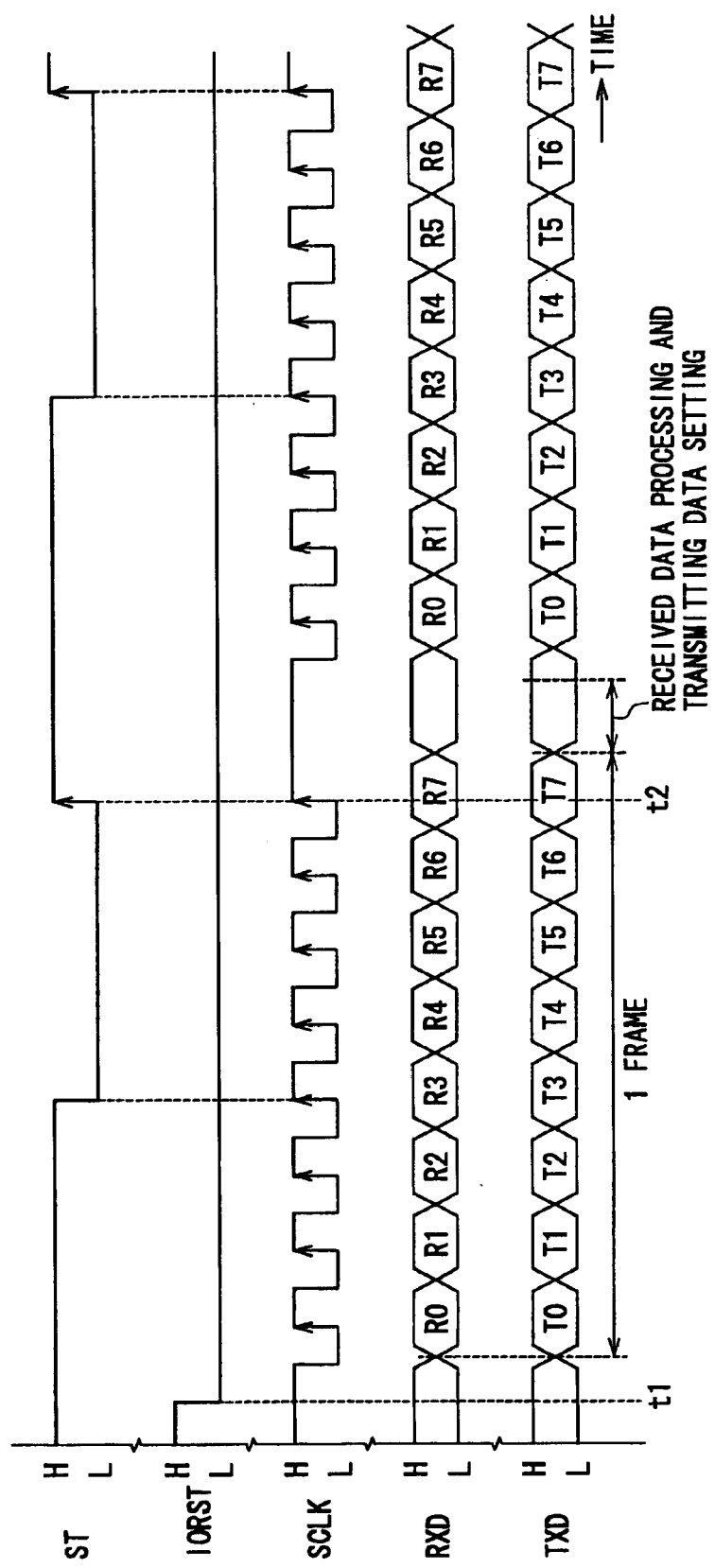
FIG. 4 shows timing charts of a serial communication.

The receiving shift register 7 receives received serial data RXD arriving at a terminal 18 and stores the data RXD therein as received data RD. In more detail, the receiving shift register 7 inputs serial data RXD bits, which start with the lowest-order bit R0 and end with the highest-order bit R7, one bit after another synchronously with the rising edges of pulses of the communication clock signal SCLK. FIG. 4 shows timing charts of the serial communication. The received 8-bit (1-frame) data RD stored in the receiving shift register 7 is transferred to the received-data processing circuit 11 to be processed thereby before the next serial data RXD arrives.

A present most recent timer value (or a timer present value TM) is transferred as transmission data TD to the transmitting shift register 8 from a timer present value register 32. The transmitting shift register 8 transmits the transmission data TD synchronously with the communication clock signal SCLK. Specifically, the transmitting shift register 8 transmits data TD bits, which start with the lowest-order bit T0 and end with the highest-order bit T7, one bit after another synchronously with the falling edges of pulses of the communication clock signal SCLK as transmission serial data TXD by way of a terminal 19.

The counter 9, which operates as a reception completion determination means, is a binary counter. This counter 9 starts an operation to count the number of pluses included in the communication clock signal SCLK when the reset signal IORST changes from an H level to an L level. A start signal ST output by the counter 9 is set at an H level before the counting operation. At a point of time the counter 9 has counted 4 pulses included in the communication clock signal SCLK, however, the start signal ST changes from the H level to an L level as shown in FIG. 4. As the counter 9 counts 4 further pulses included in the communication clock signal SCLK, the start signal ST changes from the L level back to an H level. Thus, at a point of time the start signal ST changes from the L level back to an H level, an operation carried out by the receiving shift register 7 to receive 1 frame of serial data RXD is completed. That is, the start signal ST functions as a reception completion signal.

Figure 3:
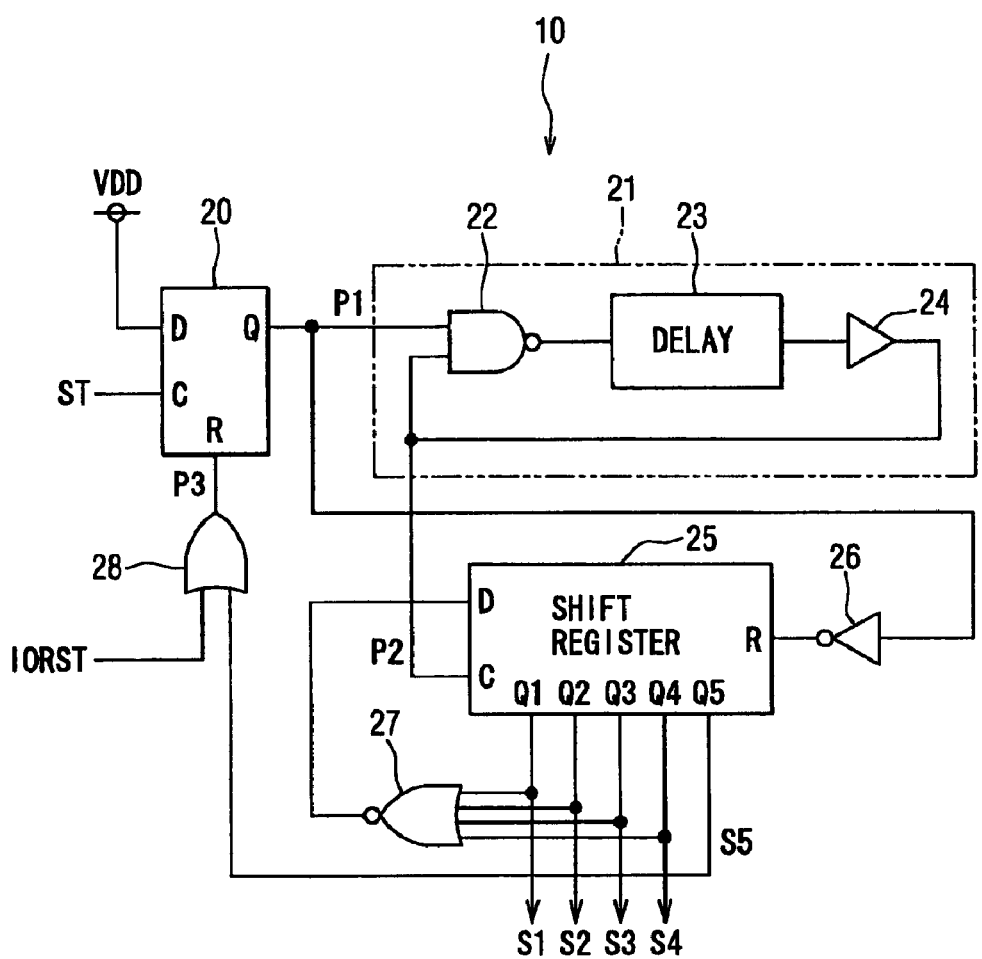
FIG. 3 is a block diagram showing a pulse generator of the timer IC.

The pulse generator 10 is constructed as shown in FIG. 3. A power supply voltage VDD is supplied to a data input terminal D of a D-type flip-flop 20. On the other hand, the start signal ST is supplied to a clock terminal C of the flip-flop 20. A ring oscillation circuit 21 is provided at a stage following the flip-flop 20. An output terminal Q of the flip-flop 20 is connected to one of two input terminals of a NAND gate 22 employed in the ring oscillation circuit 21. The ring oscillation circuit 21 is connected in series with the NAND gate 22, a delay circuit 23 and a buffer circuit 24. The output terminal of the buffer circuit 24 is connected to the other input terminal of the NAND gate 22 to form a configuration in a shape of a ring. The output terminal of the buffer circuit 24 is also the output terminal of the ring oscillation circuit 21.

The output terminal of the ring oscillation circuit 21 is further connected to a clock terminal C of a shift register 25. The shift register 25 has an output of 5 bits. A reset terminal R of the shift register 25 is connected to the output terminal Q of the flip-flop 20 by an inverter 26. Output terminals Q1, Q2, Q3 and Q4 of the shift register 25 are each connected to one of input terminals of a 4-input NOR gate 27. The output terminal of the NOR gate 27 is connected to a data terminal D of the shift register 25. The remaining output terminal Q5 of the shift register 25 is connected to one of two input terminals of an OR gate 28. The reset signal IORST cited above is supplied to the other input terminal of the OR gate 28. The output terminal of the OR gate 28 is connected to a reset terminal R of the flip-flop 20.

The received-data processing circuit 11 shown in FIG. 2 carries out processes on the received data RD stored in the receiving shift register 7 synchronously with the timing pulse signals S1 to S4 received from the pulse generator 10. The processes include an analysis and transfer of the received data RD. As will be described later, there are 2 types of received data RD. One of the types is real data such as a timer-setting value RM. The other type is a command to request oscillation or an operation to reset a timer to zero.

The received-data processing circuit 11 passes on the timing pulse signal S1 to the receiving shift register 7, the timing pulse signal S2 to a timer-setting value register 31, the timing pulse signal S3 to the timer present value register 32 and the timing pulse signal S4 to the transmitting shift register 8. The number of timing pulse signals is set at a value equal to the number of pulses required in the processing of the received data RD. In this embodiment, the number of timing pulse signals is set at 4 corresponding to the timing pulse signals S1 to S4.

The control circuit 6 comprises an oscillation circuit 29, a timer 30, the timer-setting value register 31, a timer present value register 32 and a comparator 33. The oscillation circuit 29 oscillates a ceramic vibrator 36 connected between an oscillation input terminal 34 and oscillation output terminal 35 of the timer IC 3 so as to output the system clock signal TCLK to the timer 30. In place of the ceramic vibrator 36, a crystal vibrator can also be used as well. The oscillation circuit 29 is oscillating during an H-level period of an oscillation command signal OSC received from the received-data processing circuit 11 and ceases to oscillate during an L-level period of the oscillation command signal OSC.

The timer 30 counts the number of clock pulses having a frequency equal to a predetermined fraction of the frequency of the system clock signal TCLK. The count value (the timer present value) TM of the timer 30 is transferred to the timer present value register 32 and the comparator 33 from time to time. The timer 30 is cleared to zero by a clear command signal CLR received from the received-data processing circuit 11 as a signal based on a received command, which is a sort of received data RD.

A timer-setting value RM is transferred from the received-data processing circuit 11 to the timer-setting value register 31. The comparator 33 compares the timer-setting value RM with the timer present value TM. At a point of time the timer present value TM exceeds the timer-setting value RM, the comparator 33 outputs a wakeup signal WK to a terminal 37.

In operation, the ECU 1 implemented by this embodiment diagnoses the state of the engine after the predetermined activation period of typically 5 hours has lapsed since an operation to turn off an ignition switch (not shown in the figure) to stop the engine. If the ignition switch is turned off, however, the control IC 2 stops the generation of the system clock signal, entering a sleep operating mode. Thus, the control IC 2 itself is no longer capable of carrying out the timer operation. In order to solve this problem, the timer IC 3 serves as a substitute for the control IC 2, carrying out the timer operation. As the activation period lapses, the timer IC 3 outputs the wakeup signal WK to the control IC 2. In a period of time during which the ignition switch is in a turned-on state, on the other hand, the timer operation of the timer IC 3 is not required. Thus, during such a period of time, the oscillation circuit 29 employed in the timer IC 3 does not oscillate.

In order to let the timer IC 3 serve as a substitute for the control IC 2 to carry out the timer operation, when the ignition is turned off, the control IC 2 carries out a clock-synchronized serial communication with the timer IC 3 before entering a sleep operating mode. In the clock-synchronized serial communication, the control IC 2 transmits a command clearing the timer 30 employed in the timer IC 3 to zero and a command requesting the oscillation circuit 29, which has ceased to oscillate so far, to start oscillation. In the clock-synchronized serial communication, the control IC 2 also transmits a timer-setting value RM corresponding to the activation period to the timer IC 3.

Figure 5:
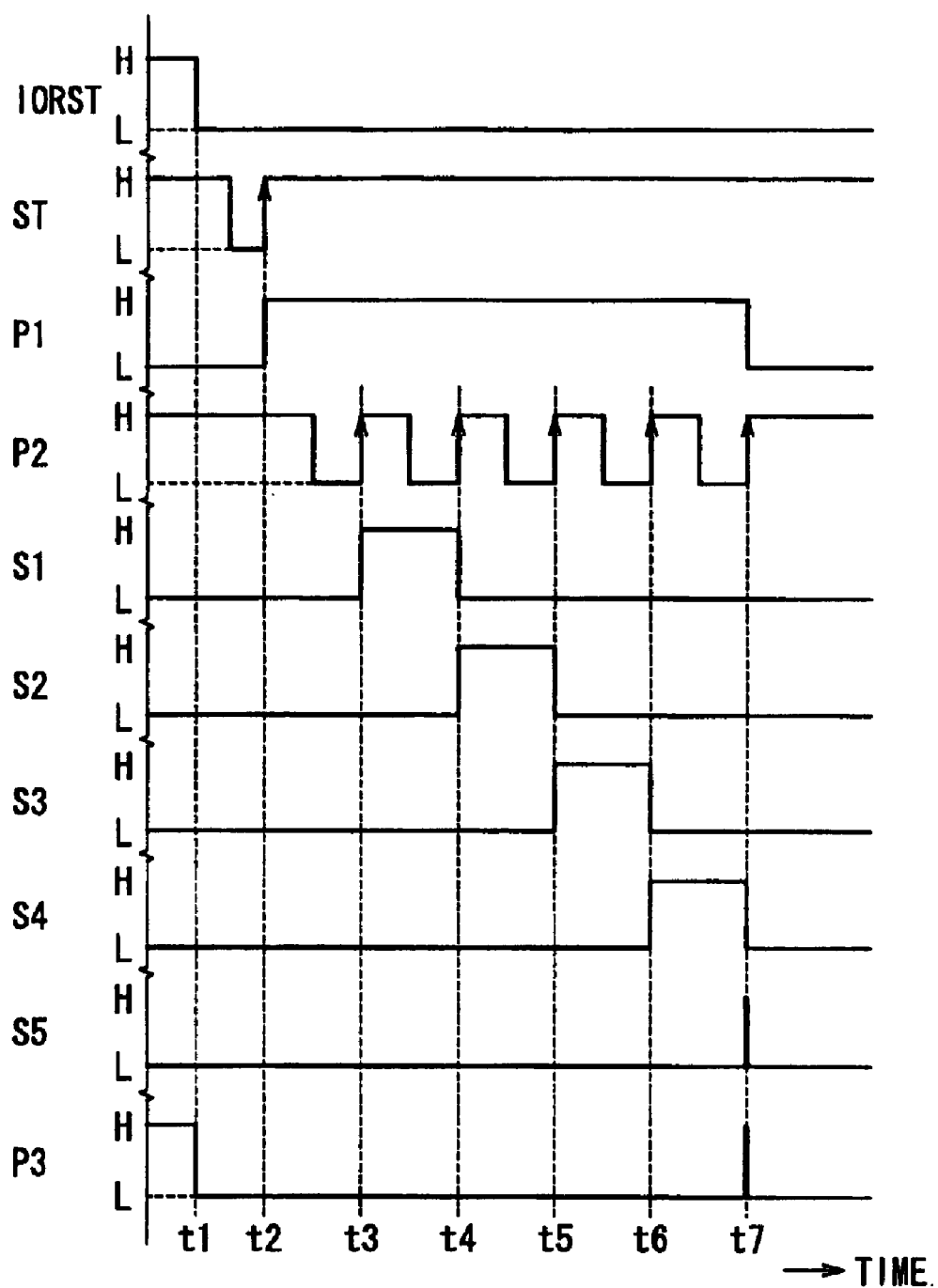
FIG. 5 shows timing charts related to the pulse generator.

FIG. 5 shows timing charts related to the pulse generator 10 employed in the timer IC 3. The timing charts represent from the top to the bottom waveforms of a reset signal IORST, a start signal ST, an output signal P1 of the flip-flop 20, an output signal P2 of the ring oscillation circuit 21, timing signals S1, S2, S3, S4 and S5 and a reset signal P3 supplied to the flip-flop 20. FIG. 5 shows the time charts of a process to receive a timer-setting value RM. However, the command clearing the timer 30 employed in the timer IC 3 to zero and the command requesting the oscillation circuit 29 to start oscillation were received prior to the process to receive a timer-setting value RM.

At a time t1 shown in FIGS. 4 and 5, the control IC 2 changes the reset signal IORST from an H level representing a reset command to an L level representing termination of the reset command, and starts a serial communication with the timer IC 3. As the reset signal IORST changes from the H level to the L level, the reset signal P3 supplied to the flip-flop 20 employed in the pulse generator 10 changes from the H level to the L level, terminating the reset state.

Then, the control IC 2 transmits the timer-setting value RM of 8 bits along with the communication clock signal SCLK. The counter 9 counts the number of pulses included in the communication clock signal SCLK. As the count value reaches 8 at a time t2, the counter 9 changes the start signal ST from an L level to an H level. At this point of time, the timer-setting value RM has been stored in the receiving shift register 7 as the received data RD.

When the start signal ST changes from the L level to the H level, the output signal P1 of the flip-flop 20 also changes from an L level to an H level, causing the ring oscillation circuit 21 to start oscillation at a predetermined frequency. Then, every time the output signal P2 of the ring oscillation circuit 21 changes from an L level to an H level, the timing pulse signals S1 to S4 and the signal S5 successively change to an H level at times t3, t4, t5, t6 and t7, respectively. As the signal S5 changes to the H level, the reset signal P3 supplied to the flip-flop 20 changes from an L level to an H level, resetting the flip-flop 20. As a result, the output signal P1 of the flip-flop 20 changes to an L level, causing the ring oscillation circuit 21 to terminate the oscillation.

Components of the timer IC 3 carry out the following operations synchronously with the timing pulse signals S1 to S4 received from the pulse generator 10 through the received-data processing circuit 11.

(1) Timing Pulse Signal S1

The received data RD (the timer-setting value RM in this case) stored in the receiving shift register 7 is transferred to the received-data processing circuit 11 synchronously with the timing pulse signal S1. The received-data processing circuit 11 determines whether the received data RD is real data or a command. If the received data RD is a command, the received-data processing circuit 11 analyzes the command. If the command is found to be a command to clear the timer 30 to zero, the received-data processing circuit 11 outputs a clear command signal CLR to the timer 30. If the command is found to be a command to start the oscillation of the oscillation circuit 29, on the other hand, the received-data processing circuit 11 changes the oscillation command signal OSC to an H level to drive the oscillation circuit 29 to start the oscillation.

(2) Timing Pulse Signal S2

If the received data RD is determined to be the timer-setting value RM in operation (1), on the other hand, the received-data processing circuit 11 transfers the timer-setting value RM to the timer-setting value register 31 synchronously with the timing pulse signal S2. In this embodiment, the data is limited to the timer-setting value RM. If a plurality of kinds of data is received, however, a register is provided for each kind of data as a register for storing the data.

(3) Timing Pulse Signal S3

The timer present value register 32 transmits the timer present value TM stored therein as transmission data TD synchronously with the timing pulse signal S3. In this embodiment, the data to be transmitted is limited to the timer present value TM. If various kinds of data are to be transmitted, however, a register is provided for each kind of data to be transmitted and only one of the registers is selected as a transmission register, from which data is to be transmitted synchronously with the timing pulse signal S3.

(4) Timing Pulse Signal S4

The timing pulse signal S4 is used as a write signal for writing the transmission data TD into the transmitting shift register 8.

The above operations are carried out to transmit a timer-setting value RM from the control IC 2 to the timer IC 3 and transmit the timer present value TM obtained at the present time from the timer IC 3 to the control IC 2. If the timer IC 3 is constructed in a configuration in which a timer-setting value RM stored in the timer-setting value register 31 can be transferred to the transmitting shift register 8, in the above operation (3), the timer-setting value RM can be transmitted back to the control IC 2 so as to allow the control IC 2 to verify the timer-setting value RM originally transmitted by the control IC 2 to the timer IC 3.

At the point of time the timer-setting value RM is transmitted from the control IC 2 to the timer IC 3, the oscillation command signal OSC has been supplied to the oscillation circuit 29 to start oscillation. At that time, however, the oscillation circuit 29 has not output a stable system clock signal TCLK. Later on, after a while, the oscillation circuit 29 outputs a stable system clock signal TCLK When the oscillation circuit 29 outputs a stable system clock signal TCLK, the timer 30 starts a counting operation based on the system clock signal TCLK. As the timer present value TM exceeds the timer-setting value RM, the comparator 33 generates a wakeup signal WK.

The wakeup signal WK causes the control IC 2 to make a transition from the sleep operating mode to the normal operating mode in which the control IC 2 diagnoses the state of the engine as described above. In addition, the control IC 2 transmits a command to the timer IC 3, requesting the timer IC 3 that the oscillation of the oscillation circuit 29 be terminated in order to reduce the power consumption of the timer IC 3. When the timer IC 3 receives the command, the received-data processing circuit 11 sets the oscillation command signal OSC to an L level in order to stop the oscillation of the oscillation circuit 29.

In accordance with the above embodiment, in the communication circuit 5 employed in the timer IC 3 as a circuit for carrying out clock-synchronized serial communications with the control IC 2, when 1 frame of received serial data RXD is stored in the receiving shift register 7 as received data RD, the pulse generator 10 outputs the timing pulse signals S1 to S4 successively in accordance with the start signal ST generated by the counter 9. Then, the received-data processing circuit 11 carries out processes on the received data RD synchronously with the timing pulse signals S1 to S4. That is, the communication circuit 5 is capable of processing the received data RD without relying on a clock signal such as the system clock signal TCLK output by the oscillation circuit 29 in the case of this embodiment. Thus, the control IC 2 is capable of communicating with the timer IC 3 independently of the oscillation state of the oscillation circuit 29.

On the other hand, the control IC 2 serving as the communication partner of the timer IC 3 is different from the conventional configuration in that the control IC 2 need not follow a special communication procedure including a transmission of a dummy communication clock signal SCLK. Thus, serial data can be continuously exchanged by following the normal procedure independently of the oscillation state of the oscillation circuit 29 employed in the timer IC 3. As a result, the communication speed does not decrease. The size of a program executed by the control IC 2 to carry out communications does not increase and the communication control implemented by the control IC 2 does not become complicated.

In addition, in the timer IC 3, when it is not necessary to operate the timer 30, the oscillation circuit 29 can be put in a stopped-oscillation state. Thus, the power consumption or the timer IC 3 and, hence, the power consumption of the ECU 1 can be reduced. Moreover, since the pulse generator 10 operates only when the receiving shift register 7 is receiving incoming data RD, it is possible to decrease the amount of power consumed in a period of time during which no incoming data RXD is received.

It is to be noted that the scope of the present invention is not limited to the descriptions given above and the embodiment shown in the diagrams. For example, the embodiment can be modified or extended as follows.

Figure 6:
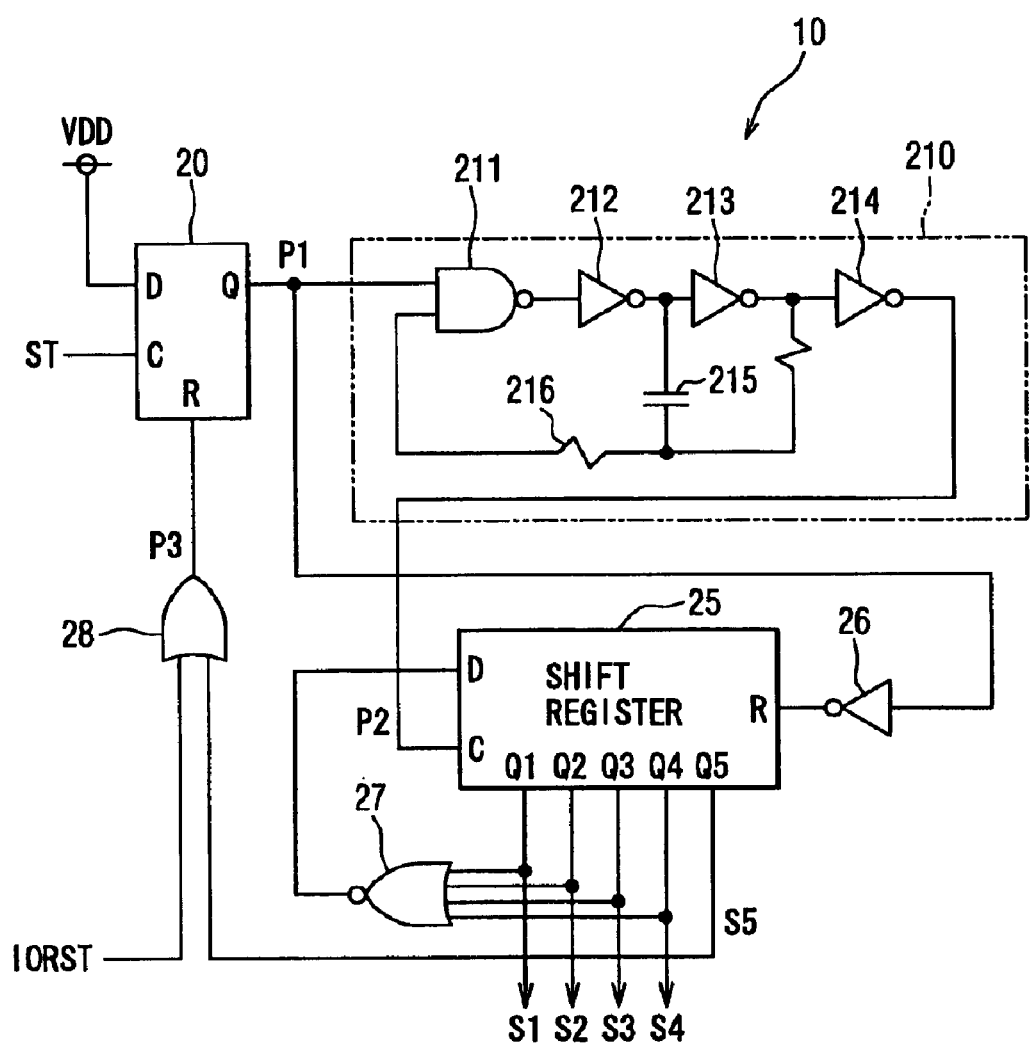
FIG. 6 is a block diagram showing a modification of the pulse generator shown in FIG. 3.

In the embodiment, the pulse generator 10 employs the ring oscillation circuit 21 as shown in FIG. 3. However, as shown in FIG. 6, the pulse generator 10 may use a CR oscillation circuit 210, which comprises a NAND gate 211, inverters 212, 213, 214, a capacitor 215 and resistors 216, 217.

In the embodiment, the counter 9 for counting the number of pulses included in the communication clock signal SCLK is employed as the reception completion determination means for detecting the fact that the receiving shift register 7 has input a predetermined number of serial-data bits. Instead it is possible to provide a configuration in which special bits such as a start bit and a stop bit can be added to the serial data and, by detection of the special bits, a start signal ST can be output. In such a configuration, the counter 9 is not required.

When a command making a request for a start of oscillation is received, the oscillation circuit 29 starts the oscillation in accordance with an oscillation command signal OSC received from the received-data processing circuit 11. In place of such a scheme, the oscillation can be started when the counter 9 has counted a predetermined number of communication-clock pulses such as 4 pulses. In accordance with such a configuration, it is not necessary to transmit the command making a request for a start of oscillation from the control IC 2. Thus, the length of the communication time can be reduced and the communication control executed by the control IC 2 can be made simpler.

When a command making a request to stop oscillation is received, the oscillation circuit 29 stops the oscillation in accordance with an oscillation command signal OSC received from the received-data processing circuit 11. In place of such a scheme, a timer for measuring time can be provided. When the timer has measured time of a predetermined length, the oscillation is stopped. With such a configuration, it is not necessary to transmit the command making a request to stop oscillation from the control IC 2. Thus, the length of the communication time can be reduced and the communication control executed by the control IC 2 can be made simpler. In addition, it is also possible to provide a configuration in which the oscillation is stopped when the timer 30 reaches a maximum value determined in advance or overflows its limit.

In the above embodiment, the communication circuit 5 serving as the clock-synchronized serial communication device is applied to the timer IC 3 employed in the ECU 1. However, the communication circuit 5 can also be used in control IC 2 or any other IC having other functions. In particular, the communication circuit 5 can be applied effectively to a system (including an IC) with no system clock signal or a system with a system clock signal put in a stopped state.

Further modifications and alterations are also possible without departing from the spirit of the invention.

What is claimed is:

1. A device comprising:
   a receiving shift register for receiving input serial data synchronously with a communication clock signal;
   a reception completion determination means coupled to the receiving shift register, the reception completion determination means for also receiving the communication clock signal and for outputting a reception completion signal when detecting that the receiving shift register has received a predetermined number of bits of the serial data based on the communication clock signal;
   a pulse-signal generation means for generating a timing pulse signal, which comprises only a predetermined number of timing pulses required for processing the input serial data, in accordance with generation of the reception completion signal by the reception completion determination means; and
   a data processing means for processing the input serial data synchronously with the timing pulse signal,
   wherein the reception completion determination means includes a counter for counting a number of input pulses included in the communication clock signal, and for outputting the reception completion signal when a count value of the counter reaches a predetermined number.

2. A device comprising:
   a receiving shift register for receiving input serial data synchronously with a communication clock signal;
   a reception completion determination means coupled to the receiving shift register, the reception completion determination means for also receiving the communication clock signal and for outputting a reception completion signal when detecting that the receiving shift register has received and input a predetermined number of bits of the serial data based on the communication clock signal;
   a pulse-signal generation means for generating a timing pulse signal, which comprises only a predetermined number of timing pulses required for processing the input serial data, in accordance with generation of the reception completion signal by the reception completion determination means; and
   a data processing means for processing the input serial data synchronously with the timing pulse signal,
   wherein the reception completion determination means monitors the serial data for a special bit added to the serial data and outputs the reception completion signal when the special bit is detected.

3. A device according to claim 1, further comprising:
   an oscillation control unit for generating an oscillation command signal in response to receiving an oscillation start signal from the reception completion determination means;
   a control circuit operating synchronously with the system clock signal and including an oscillation unit in communication with the oscillation control unit, the oscillation unit for oscillating to generate a system clock signal upon receiving the oscillation command signal output from the oscillation control unit;
   wherein the oscillation control unit outputs the oscillation command signal functioning as an oscillation start signal when the counter serving as the reception completion determination means has counted a predetermined number of the input pulses included in the communication clock signal.

4. An electronic control unit comprising:
   a receiving shift register for receiving input serial data synchronously with a communication clock signal;
   a reception completion determination device coupled to the receiving shift register, the reception completion determination device for also receiving the communication clock signal and for outputting a reception completion signal upon detecting, based on the communication clock signal, that the receiving shift register has received a predetermined number of bits of the serial data;
   a pulse-signal generator for generating a timing pulse signal, which includes only a predetermined number of timing pulses required for processing the input serial data, in accordance with generation of the reception completion signal by the reception completion determination means;
   a data processor for processing the input serial data synchronously with the timing pulse signal, the data processor including an oscillation control unit for generating an oscillation command signal in response to receiving the reception completion signal from the reception completion determination device; and
   a control circuit for operating synchronously with the system clock signal and including an oscillation unit in communication with the oscillation control unit, the oscillation unit for oscillating to generate a system clock signal upon receiving the oscillation command signal from the oscillation control unit.

5. A device according to claim 4, further comprising:

a timer included in the control circuit and in communication with the oscillation unit for counting the system clock signal, wherein the oscillation control unit outputs the oscillation command signal functioning as an oscillation end signal when the timer has measured time of a predetermined length by counting the system clock signal.

6. The electronic control unit according to claim 4, wherein the oscillation control unit outputs the oscillation command signal based on command data corresponding to the serial data.

\* \* \* \* \*